United States Patent
Oota et al.

(10) Patent No.: US 7,790,081 B2
(45) Date of Patent: Sep. 7, 2010

(54) METHOD OF MANUFACTURING FORMED PRODUCT COATED IN MOLD

(75) Inventors: Kenji Oota, Aichi (JP); Kenji Yonemochi, Aichi (JP); Toshio Arai, Yamaguchi (JP); Etuo Okahara, Yamaguchi (JP); Kazuaki Kobayashi, Yamaguchi (JP); Takashi Okusako, Yamaguchi (JP)

(73) Assignees: Dai Nippon Toryo Co., Ltd., Osaka-shi (JP); Ube Machinery Corporation, Ltd., Ube-shi (JP)

( * ) Notice: Subject to any disclaimer, the term of this patent is extended or adjusted under 35 U.S.C. 154(b) by 1171 days.

(21) Appl. No.: 10/494,369

(22) PCT Filed: Nov. 6, 2002

(86) PCT No.: PCT/JP02/11575

§ 371 (c)(1),
(2), (4) Date: May 12, 2004

(87) PCT Pub. No.: WO03/043796

PCT Pub. Date: May 30, 2003

(65) Prior Publication Data

US 2005/0012241 A1    Jan. 20, 2005

(51) Int. Cl.
*B29C 45/16* (2006.01)

(52) U.S. Cl. ............ 264/236; 264/255; 264/347; 264/235; 264/346; 264/328.7; 264/328.8

(58) Field of Classification Search ............ None
See application file for complete search history.

(56) References Cited

U.S. PATENT DOCUMENTS

| 5,171,508 | A | * | 12/1992 | Ishizu et al. ............... 264/236 |
| 5,628,949 | A | * | 5/1997 | Bordener .................... 264/161 |
| 5,902,534 | A | * | 5/1999 | Fujishiro et al. ............ 264/255 |
| 6,180,043 | B1 | * | 1/2001 | Yonemochi et al. ......... 264/255 |
| 6,517,755 | B1 | * | 2/2003 | Okamoto et al. ........... 264/40.5 |
| 6,982,056 | B2 | * | 1/2006 | Sullivan .................... 264/255 |

FOREIGN PATENT DOCUMENTS

| EP | 0 197 496 | 10/1986 |
| EP | 0 934 808 | 8/1999 |
| JP | 54-36369 | 3/1979 |

(Continued)

*Primary Examiner*—Edmund H. Lee
(74) *Attorney, Agent, or Firm*—Oblon, Spivak, McClelland, Maier & Neustadt, L.L.P.

(57) ABSTRACT

A process producing an in-mold coated molded product. The process molds a thermoplastic resin material under a mold-clamping pressure in a mold including a fixed mold part and a movable mold part each heated at a predetermined temperature, separates the fixed mold part and the movable mold part when the molded material surface is solidified such that it is durable to a pressure of injection and flow of a coating agent, and injects the coating agent containing a thermosetting resin material between an inner surface of the mold and the molded product obtained. The process also coats the molded product surface with the coating agent as the mold is re-clamped after injecting the coating agent, takes out the molded product coated with the coating agent when the coating agent is cured such that it is neither peeled off nor cracked by opening the mold, and re-heats the molded product after taking it out.

2 Claims, 3 Drawing Sheets

FOREIGN PATENT DOCUMENTS

| | | |
|---|---|---|
| JP | 4-139962 | 10/1979 |
| JP | 55-65511 | 5/1980 |
| JP | 56-161159 | 12/1981 |
| JP | 57-140 | 1/1982 |
| JP | 60-212467 | 10/1985 |
| JP | 60-221437 | 10/1985 |
| JP | 01-229605 | 9/1989 |
| JP | 3-69324 | 3/1991 |
| JP | 04-131212 | 5/1992 |
| JP | 5-70712 | 3/1993 |
| JP | 5-148375 | 6/1993 |
| JP | 5-301251 | 11/1993 |
| JP | 5-318527 | 12/1993 |
| JP | 6-107750 | 4/1994 |
| JP | 6-157785 | 6/1994 |
| JP | 6-190833 | 7/1994 |
| JP | 7-112450 | 5/1995 |
| JP | 7-223231 | 8/1995 |
| JP | 8-113761 | 5/1996 |
| JP | 8-142119 | 6/1996 |
| JP | 9-52257 | 2/1997 |
| JP | 2001-38770 | 2/2001 |
| JP | 2001-71345 | 3/2001 |
| JP | 2001-96573 | 4/2001 |

* cited by examiner

METHOD OF MANUFACTURING FORMED PRODUCT COATED IN MOLD

TECHNICAL FIELD

The present invention relates to a process for producing an in-mold coated molded product, obtained by molding a synthetic resin material in a forming mold, and coating the surface of the obtained synthetic resin material by injecting a coating agent in the same forming mold.

BACKGROUND ART

Coating the surface of a resin molded product employed for automobiles, electrical appliances and architectural members, has been widely performed for the purposes of adding a value such as fanciness or of increasing the weather resistance to prolong the service life of the product. As such a method of coating, a spray coating is commonly used. However, in recent years, strong interests are attracted to environmental problems, and from viewpoints that emission of harmful organic materials into the atmosphere from painting factories are becoming to be severely restricted and protection of employees' health should be considered to be more important, development of a technique instead of spray coating processes is urgently requested.

Under these circumstances, an in-mold coating process draws an attention, which is such a process that after injecting a coating agent between the surface of a resin molded product formed in a mold and a cavity surface of the mold, the coating agent is cured to obtain a integrally molded product which is a resin molded product having a coated film on its surface. The in-mold coating method is expected to remarkably contribute to reduce the cost by omitting the coating process.

Such in-mold coating process is mainly employed for improving the surface of molded products of thermosetting resin material such as SMC (Sheet Molding Compound) and BMC (Bulk Molding Compound). However, it has not been widely employed yet in the process of injection molding of a thermoplastic resin. One of the major reasons is as follows. Namely, when the thermosetting coating agent is cured in the mold by utilizing temperatures of the mold surface and the molded product surface, a high temperature of the mold and a long curing time are required to sufficiently cure the coating agent. However, the temperature of the mold is commonly set to a low temperature in a case of a thermoplastic resin material.

Such in-mold coating process in injection molding of a thermoplastic resin, is disclosed, for example, in JP-A-5-301251 and JP-A-5-318527.

Further, in JP-A-5-301251, the temperatures of a thermoplastic resin and the surface of the mold are set to be higher than the curing temperature of the coating agent.

However, the inventors of the present application have found that the appearance of the surface of a coating agent is influenced significantly by the nature of flowing of the coating agent when it flows in a mold, and that indisturbance of the flow front of the material is an important condition. Under the high mold temperature capable of sufficiently curing the coating agent as described above, the coating agent tends to be partially gelled or the viscosity of the coating agent tends to be increased during the flowing, which makes the flowing of the coating agent uneven and causes wrinkles on the surface of the coating agent or defects of the coating film such as mottles. Such a phenomenon is remarkable in a case of a coating agent containing an aluminum pigment or a pearl pigment, since the flow of the coating agent becomes uneven in the mold due to gelation or an increase of the viscosity and orientation of a flake pigment such as the aluminum pigment or the pearl pigment is disturbed, whereby generation of mottles or weldlines becomes remarkable. Therefore, until the coating agent covers the entire surface of the molded product to be coated, it is necessary to maintain sufficient flowability by preventing the gelation or the increase of the viscosity. However, for this purpose, it is necessary to either lower the temperature of the mold or to slow down the gelation of the coating agent. This means that the curing reaction is depressed and the curing time becomes extremely long, and in some cases, the curing enough to exhibit a sufficient performance could not be achieved, and therefore, such courses are undesirable.

Further, JP-A-5-318527 discloses a process of curing a thermosetting coating agent by heating a mold by e.g. a high-frequency induction heating to cure the coating agent after the coating agent is injected into the mold. However, in this process, since the mold is heated and cooled in the forming cycle, there are disadvantages of energy loss and a long forming cycle.

The present invention has been made under the above circumstances. It is an object of the present invention to provide a process for producing an in-mold coated molded product wherein after a forming material of thermoplastic resin is molded in a mold, a coating agent is coated on the surface of the molded product in the same mold whereby the molded product with a coating, which is free from wrinkles, cracks, mottles and weldlines in its cured coating film and has a high quality can be assured.

DISCLOSURE OF THE INVENTION

The present invention provides a process for producing an in-mold coated molded product, comprising:

a step of molding a thermoplastic resin material under a mold-clamping pressure in a mold comprising a fixed mold part and a movable mold part each heated at a predetermined temperature, separating the fixed mold part and the movable mold part when the surface of the molded material is solidified to such a degree that it is durable to a pressure of injection and flow of a coating agent, and injecting the coating agent containing a thermosetting resin material between an inner surface of the mold and the molded product obtained;

a step of coating the surface of the molded product with the coating agent as the mold is re-clamped after the injection of the coating agent;

a step of taking out the molded product coated with the coating agent when the coating agent is cured to such a degree that it is not peeled off nor cracked by opening the mold; and a step of re-heating the molded product after taking it out.

Figure 1:
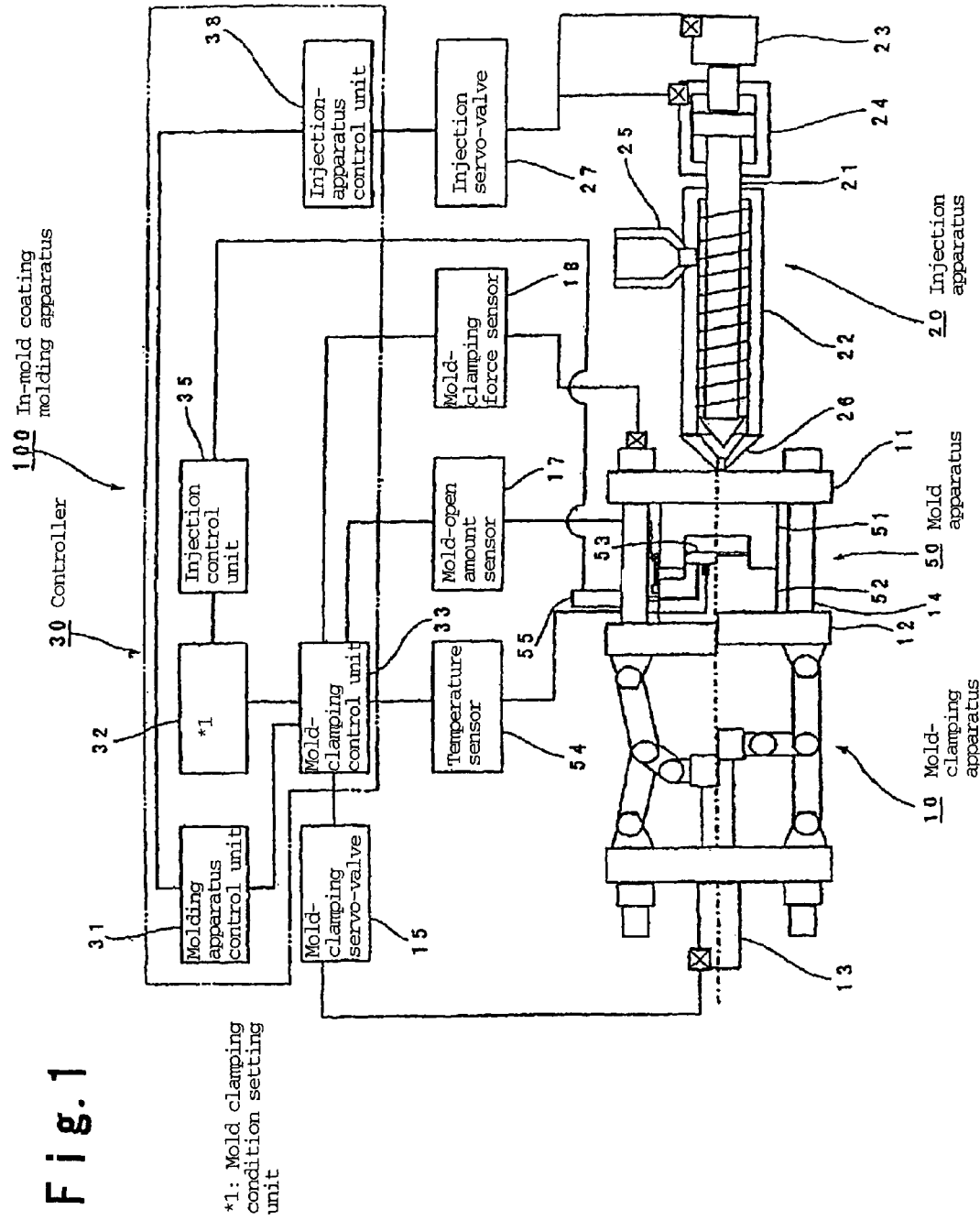
FIG. 1: a diagram showing the entire construction of an apparatus for producing an in-mold coated molded product according to an example of the present invention.

| Explanation of numerals | |
|---|---|
| 10: mold-clamping apparatus | 11: fixed plate |
| 12: movable plate | |
| 13: mold-clamping cylinder | 14: tie rod |
| 15: mold-clamping servo-valve | |
| 16: stroke sensor | |
| 17: mold separation amount sensor | |
| 18: mold-clamping force sensor | |
| 20: injection apparatus | 21: screw |
| 22: barrel | |
| 23: hydraulic motor | |
| 24: injection cylinder | 25: hopper |
| 26: nozzle | |
| 27: injection servo-valve | 30: controller |
| 31: molding apparatus control unit | |
| 32: mold-clamping condition setting unit | |
| 33: mold-clamping control unit | |
| 35: injector control unit | |
| 38: injection-apparatus control unit | |
| 50: mold apparatus | 51: fixed mold |
| 52: movable mold | 53: mold cavity |
| 54: temperature sensor | |
| 55: coating agent injector | |
| 100: apparatus for producing an in-mold coated molded product | |

BEST MODE FOR CARRYING OUT THE INVENTION

According to the present invention, a coating film in a half-cured state is formed in a mold, a coated molded product is taken out from the mold and re-heated in another process to re-activate a curing-initiator remaining in the coating agent by a heat energy to cure the coating agent into a final-cured state, whereby it becomes possible to obtain a coated molded product having little defect in the external appearance and excellent in the coating film properties.

In the present invention, the coating agent is preferably not gelled until it covers the surface of a molded product. Accordingly, the temperature of a mold is preferably in a range in which the gelation time of the coating agent is from 5 to 60 seconds, more preferably from 7 to 40 seconds. Here, the gelation time is defined as a time required until the coating agent becomes non-flowable, and the gelation time described herein is measured by a ICAM-1000 Dielectro Meter (manufactured by Micromet Instruments, Inc.). If the temperature of the mold is a temperature at which the gelation time is shorter than the above-mentioned gelation time, the coating agent tends to be gelled in the process of flowing in the mold or the viscosity tends to be increased, such being not preferred. Further, if the temperature is a temperature at which the gelation time becomes longer than the above-mentioned gelation time, it takes a long time to half-cure the coating film to such a degree that the coating agent is not peeled off and cracks do not appear when the mold is separated, such being not preferred from viewpoints of the forming cycle and productivity. Further, the temperature of re-heating the molded product is preferably from 10 to 40° C. higher than the above-mentioned mold temperature, since the coating agent is cured and proper properties of the coating film can be obtained.

Here, the mold temperature in the present invention means the average temperature of the cavity surface of the mold in a period from just before injecting the coating agent in the mold cavity to the almost termination of the curing reaction of the coating agent. However, even though it is difficult to measure the temperature of the cavity surface of the mold, it is generally possible to use the setting temperature of the mold as the temperature of the cavity surface of the mold in the present invention. Further, if there is a large difference between the setting temperature of the mold and the temperature of the cavity surface of the mold, it is of course within the scope of the present invention to determine the mold setting temperature taking the above-mentioned temperature difference into account so that the temperature of the cavity surface of the mold becomes within the preferred range of the present invention.

Such a coating agent containing thermosetting resin material to be used in the present invention, is preferably one containing a thermosetting resin material for which an organic peroxide is used as an initiator causing a curing reaction, from a viewpoint of curing properties of the coating agent.

Further, the above organic peroxide is preferably one comprising at least two types of organic peroxides having different one-minute half-life temperatures. The purpose is to let a part of organic peroxide remain in the coating agent just after the molded product coated with the coating agent is taken out from the mold. Further, the organic peroxides preferably comprises two types of organic peroxides, at least one type of which has a one-minute half-life temperature substantially the same as the temperature of the mold and the other type of which has a one-minute half-life temperature preferably from 10 to 40° C. higher than the mold temperature. In such measures, a plenty of organic peroxide remains in the coating agent formed on the molded product when it is taken out from the mold, such being more preferred from a viewpoint of starting the reaction when the product is re-heated.

As a thermoplastic resin material to be used in the present invention, a thermoplastic resin material such as polyethylene, polypropylene, acrylonitrile-butadiene-styrene copolymer, polycarbonate, polyamide, polyethylene terephthalate, polybutylene terephthalate or a modified polyphenylene ether, or an alloy material thereof or a material obtained by mixing a fiber form or a flake pigment thereto, may be mentioned.

Further, as a coating agent containing a thermosetting resin material to be used in the present invention, various types of known in-mold coating agents can be employed, and for example, coating agents described in publications such as JP-A-54-36369, JP-A-54-139962, JP-A-55-65511, JP-A-57-140, JP-A-60-212467, JP-A-60-221437, JP-A-1-229605, JP-A-5-70712, JP-A-5-148375, JP-A-6-107750 and JP-A-8-113761, may be mentioned as typical coating agents.

As a thermosetting resin material forming the coating agent, an oligomer having at least two (meth)acrylate groups such as an urethane acrylate oligomer or an epoxy acrylate oligomer, or resins thereof; or a material having as the main component a vehicle component composed by from 20 to 70 wt % of an unsaturated polyester resin and from 80 to 30 wt % of a copolymerizable ethylenic unsaturated monomer such as methyl (meth)acrylate, ethyl (meth)acrylate, propyl (meth)acrylate, butyl (meth)acrylate, 2-ethylhexyl (meth)acrylate, (meth)acrylic acid, vinyl acetate, tripropylene glycol diacrylate or styrene, which requires an organic peroxide as an initiator for a curing reaction, are particularly preferred. To such a coating agent, various types of coloring pigments, aluminum pigments, pearl pigments, mold release agents, photostabilizers, etc. may be added.

As the organic peroxides, bis(4-t-butylcyclohexyl)peroxydicarbonate, diisopropylperoxydicarbonate, di-2-ethylhexylperoxydicarbonate, t-octylperoxyoctoate, t-amylperoxyoctoate, t-butylperoxyoctoate, t-octylperoxybenzoate, dibenzoylperoxide, 1,1-di-t-butylperoxycyclohexane, t-butylperoxy-3,5,5-trimethylhexanoate, 2,2-di-t-butylperoxybutane, t-butylperoxyisopropylcarbonate, t-amylperoxybenzoate, t-butylperoxybenzoate, etc. may be mentioned.

Figure 2:
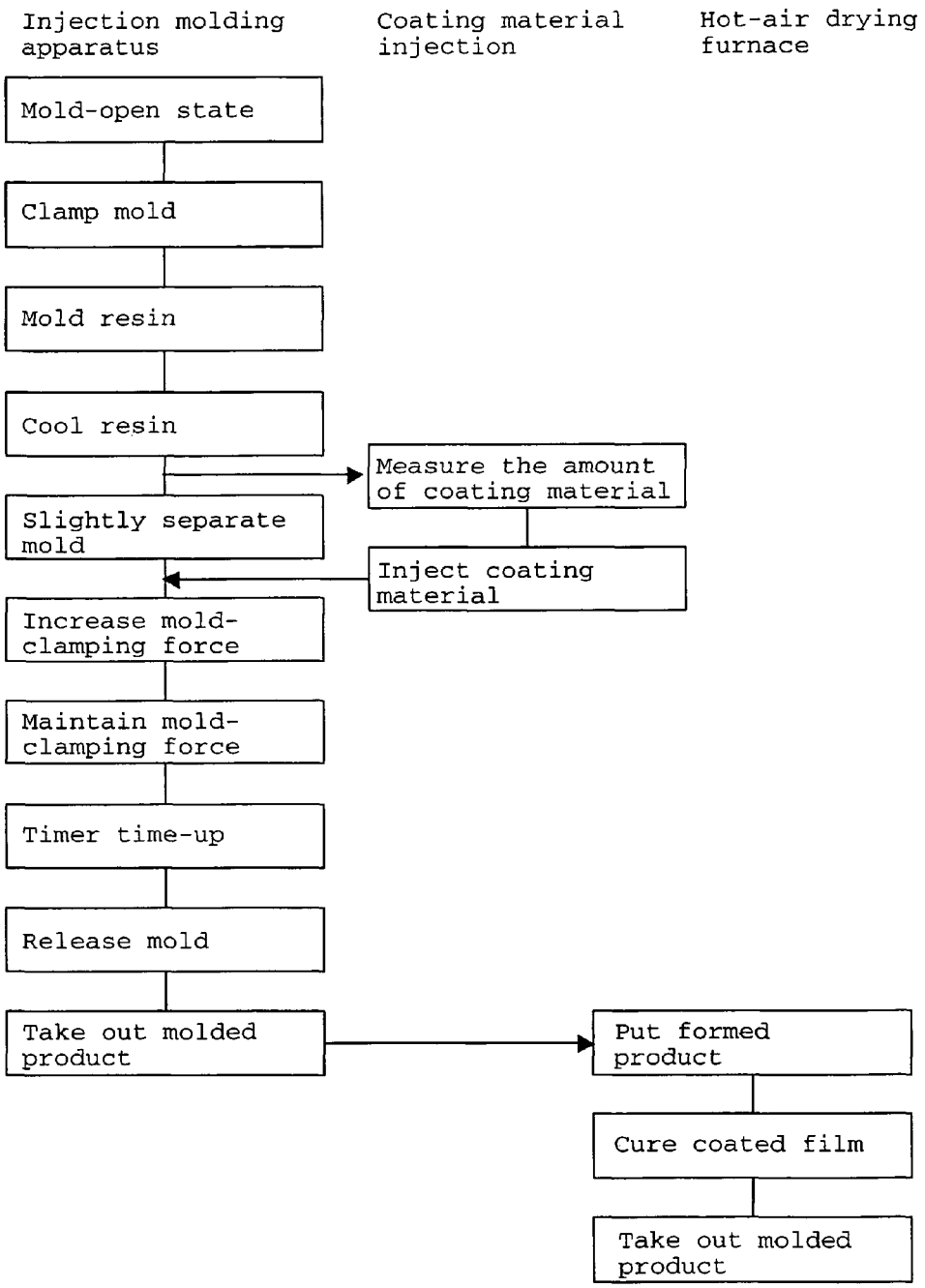
FIG. 2: a flowchart of carrying out an example by employing the apparatus for producing an in-mold molded product shown in FIG. 1.
Figure 3:
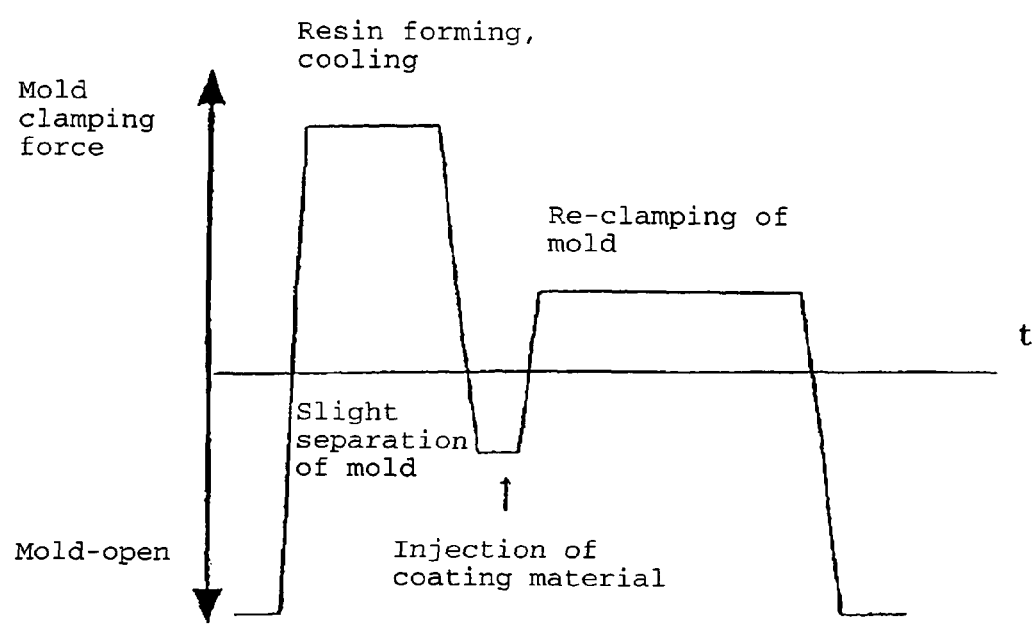
FIG. 3: a view showing the sequence of mold clamping and mold separating at a time of carrying out the example by employing the apparatus for producing an in-mold coated molded product shown in FIG. 1.

Now, Examples of the present invention will be described in detail with reference to the drawings. Both of FIG. 1 and FIG. 2 are according to examples of the present invention. FIG. 1 is a diagram showing entire construction of an apparatus for producing an in-mold coated molded product, and FIG. 2 is a flowchart in a case of performing the molding operations described in Examples 1 and 2 by employing the apparatus for producing an in-mold coated molded product shown in FIG. 1.

As shown in FIG. 1, the apparatus 100 for producing an in-mold coated molded product used in the present invention, is a generally used toggle type injection molding machine which comprises roughly a mold clamping apparatus 10, an injection apparatus 20, a controller 30 and a mold apparatus 50.

The mold clamping apparatus 10 comprises a fixing plate 11 to which the mold apparatus 50 is attached, and a movable plate 12. The mold clamping apparatus 10 is constituted so that the movable plate 12 is guided by a tie-rod 14 and moved back and forth with respect to the fixed plate 11 by a mold clamping cylinder 13 to open or close the mold apparatus 50.

In the injection apparatus 20, a screw 21 having a spiral-shaped flight portion is disposed along the inner periphery of a cylindrical barrel 22 so that the screw 21 is rotatable by a hydraulic motor 23 and movable back and forth. As the screw 21 rotates, resin pellets supplied in the hopper 25 are fed forward the screw 21, and the resin pellets are heated by a heater, not shown, attached to the outer periphery of the barrel 22, and applied with a kneading action by the rotation of the screw, whereby the resin pellets are melted.

When the amount of the melted resin fed forward the screw 21 becomes a predetermined amount, the rotation of the hydraulic motor 23 is stopped and the injection cylinder 24 drives the screw 21 forward, whereby the melted resin stored at a front of the screw 21 is injected through a nozzle 26 into a mold cavity 53 of the mold apparatus 50.

In the mold apparatus 50, a fixed mold 51 attached to the fixed plate 11 and a movable mold 52 attached to the movable plate 12 are provided. In the movable mold 52, a coating agent injector 55 for injecting the coating agent into the mold cavity 53 and a temperature sensor 54 for detecting the surface temperature of the synthetic resin material in the mold cavity 53 are disposed.

Then, the construction of the controller 30 will be described. As shown in FIG. 1, the controller 30 comprises a molding apparatus control unit 31 for synchronizing the operation of the mold clamping apparatus 10 with the operation of the injection apparatus 20 and for controlling the entire system of the controller 30, and an injection-apparatus control unit 38 for controlling the operation of the injection apparatus 20. These control units 31 and 38 have the same control functions as control units of a common injection molding apparatus. On the other hand, as a control unit having a unique control function of the apparatus 100 for producing an in-mold coated molded product, there are provided an injector control unit 35 for controlling the operation of a coating agent injector 55 in accordance with molding condition data signal received from a mold-clamping condition setting unit 32, and a mold-clamping control unit 33 for controlling the operation of the mold-clamping apparatus 10 in accordance with the molding condition data signal received from the mold-clamping condition setting unit 32 in the same manner.

In the mold-clamping condition setting unit 32, molding conditions i.e. open/close speed, operation timing, mold-separation amount and mold-clamping force of the mold-clamping apparatus 10, and injection amount, injection speed, injection timing and injection pressure of the coating agent injector 55 are set. The mold-clamping condition setting unit 32 sends molding condition data regarding the injection amount, injection speed, injection timing and injection pressure of the coating agent injector 55 to the injector control unit 35, and sends molding condition data signal regarding open/close speed, operation timing, mold separation amount and mold-clamping force of the mold-clamping apparatus 10 to the mold-clamping control unit 33.

Then, an example of the operations of the apparatus 10 for producing an in-mold coated molded product comprising the controller 30 having a construction as described above, will be described.

Under a feedback control by a control signal transmitted from the mold-clamping control unit 33 and by the mold-clamping servo-valve 15, the movable mold 12 is moved forward from the mold-open position to touch the fixed mold 11 by the mold-clamping cylinder 13 in accordance with the mold-closing speed pattern set in the mold-clamping condition setting unit 32. Then, under the feedback control by a control signal transmitted from the mold-clamping control unit 33 and by the mold-clamping servo-valve 15, the movable mold 12 is further moved forward by the mold-clamping cylinder 13 in accordance with the mold-clamping force pattern set in the mold-clamping condition setting unit 32, to extend the tie-rod 14 to effect a predetermined mold-clamping force to the mold apparatus 50. At a predetermined operation timing in such an operation of the mold-clamping apparatus 10, the degree of opening of the injection servo-valve 27 is controlled by a control signal transmitted from the injection apparatus control unit 38 to drive the injection cylinder 24 to move the screw 21 forward, whereby melted resin stored at the front of the screw 21 is injected through the nozzle 26 into the mold cavity 53 to form a molded product of the synthetic resin. Here, the molding apparatus control unit 31 sends and receives operation timing signal so that the operations of the mold-clamping apparatus 10 and the injection apparatus 20 are in synchronism with each other.

Then, the movable mold 12 is moved backward by the mold-clamping cylinder 13, and under a feedback control by a control signal transmitted from the mold-clamping control unit 33 and by the mold-clamping servo-valve 15, a spacing is provided between the surface of the synthetic resin material and the surface of the mold cavity 53 by applying a predetermined mold-open amount set in the mold-clamping condition setting unit 32, and thereafter, in accordance with the injection amount, injection speed, injection timing and injection pressure of the coating agent injector 55 set in the mold-clamping condition setting unit 32, the coating agent injector 55 is driven by a control signal transmitted from the injector control unit 35 to inject the coating agent into the mold cavity 53.

Then, when an injection-completion signal from the injector control unit 35 is received, the movable mold 12 is moved forward again by the mold-clamping cylinder 13 under a feedback control of the control signal transmitted from the mold-clamping control unit 33 and by the mold-clamping servo-valve 15, and an operation is performed in accordance with the mold-clamping timing, a mold-open amount pattern and a mold-clamping force-time pattern. Accordingly, the injected coating agent is spread over the entire surface of the synthetic resin material, and optimum molding conditions for the external appearance quality of the coating film are provided.

Thereafter, under a feedback control by a control signal transmitted from the mold-clamping control unit 33 and by the mold-clamping servo-valve 15, the movable mold 12 is moved backward to the mold open position by the mold-clamping cylinder 13 in accordance with the operation timing and the mold-opening speed pattern set in the mold-clamping condition setting unit 32, and a coated molded product is taken out from the mold apparatus 50 to complete the forming cycle.

EXAMPLES

Now, the present invention will be described in further detail with reference to Examples. However, the scope of the present invention is not limited to these Examples.

Example 1

By employing a mold having a Share Edge structure capable of producing a box-shaped product of 300 mm long, 210 mm wide, 50 mm deep and 3 mm thick, a heat resisting ABS (tradename: Cycolac MX40, manufactured by Ube Cycon) was injection-molded by applying a mold-clamping force of 200 t. At this time, the resin temperature was 250° C. and the mold temperature was 85° C. The cooling time of molding this resin was 30 seconds. Thereafter, the mold was separated to have a spacing of 1.5 mm and 12 cc of the coating agent A or B described in Table 1 was injected. It had been known that the gelation time of the coating agent A is 22 seconds at 85° C. and the gelation time of the coating agent B is 30 seconds at 85° C. The time required to inject the coating agent was 0.5 seconds. 0.1 seconds after the injection of the coating agent, re-clamping of the mold was started and the clamping force was increased to 20 t in 1 second, and the clamping was maintained for 60 seconds. Thereafter, the mold was opened to take out the molded product. The molded product was immediately put into a hot-air drying furnace having a setting temperature of 100° C., reserved there for 20 minutes and taken out. A cured coating film having a thickness of about 100 μm was formed over the entire surface of the molded product, whereby a uniformly coated molded product having no defect such as mottles, wrinkles and cracks, was produced.

Comparative Example 1

The steps of injecting the coating agent, starting the re-clamping and increasing the clamping force to 20 t in 1 second, were performed in the completely same manner as Example 1. However, the clamping was maintained for 20 seconds instead of 60 seconds, and the mold was opened to take out the molded product. Of the molded product not re-heated after it was taken out from the opened mold, a coating film having a thickness of about 100 μm was formed over its entire surface. However, the coating film had low gloss and low hardness since it was not re-heated.

The evaluation results of the coating film properties of Example 1 and Comparative Example 1 are shown in Table 2.

TABLE 1

| | Coating agent (wt %) | |
| --- | --- | --- |
| | A | B |
| Urethane acrylate oligomer (1) | 60.0 | 60.0 |
| Tripropylene glycol diacrylate | 40.0 | 40.0 |
| Titanium dioxide | 90.0 | — |

TABLE 1-continued

| | Coating agent (wt %) | |
| --- | --- | --- |
| | A | B |
| Carbon black | 0.5 | 0.1 |
| Aluminum pigment (1) | — | 0.2 |
| Aluminum pigment (2) | — | 0.8 |
| Zinc stearate | 1.5 | 1.5 |
| Tinuvin 292 | — | 0.8 |
| Tinuvin 1130 | — | 1.6 |
| Bis(4-t-butylcyclohexyl)peroxydicarbonate | 2.0 | 1.5 |

Urethane acrylate oligomer (1) MN = 1500
Aluminum pigment (1) Average particle size 20 μm, aspect ratio 30
Aluminum pigment (2) Average particle size 25 μm, aspect ratio 2
Tinuvin: Tradename of Chiba-Geigy
Bis(4-t-butylcyclohexyl)peroxydicarbonate: Organic peroxide having a one-minute half-life temperature of 92° C.

TABLE 2

| | Ex. 1 | | Comp. Ex. 1 | |
| --- | --- | --- | --- | --- |
| | A | B | A | B |
| Specular gloss (*1) | 88 | 96 | 78 | 68 |
| Pencil scratch value (*1) | F | HB | 3B | 3B |
| Grid tape method (*1) | 10 | 10 | 2 | 0 |

(*1): In accordance with JISK 5400 Testing methods for paints

Example 2

By employing the same mold employed in Example 1, a polyamide resin (tradename: UBE nylon PA1013B, manufactured by Ube Industries, Ltd.) was injection-molded by applying a mold-clamping force of 300 t in the same manner as in Example 1. At this time, the resin temperature was 250° C., the mold temperature was 90° C. and the cooling time of molding this resin was 30 seconds. Thereafter, the mold was separated to have a spacing of 1.5 mm and 12 cc of the coating agent C described in Table 3 was injected. It had been known that the gelation time of the coating agent is 25 seconds at 90° C. The time required to inject the coating agent was 0.5 seconds. 3 Seconds after the completion of injecting the coating agent, re-clamping of the mold was started and the clamping force was increased to 20 t in 3 seconds, this state was maintained for 60 seconds, and thereafter, the mold was opened to take out the molded product. Then, the molded product was reserved in a hot-air drying furnace having a setting temperature of 120° C. for 20 minutes and taken out. There formed a cured coating film having a thickness of about 100 μm over the entire surface of the molded product, and the molded product was a coated molded product having no defects such as weldlines of aluminum pigment, uneven orientation, wrinkles and cracks.

Comparative Example 2

The steps of injecting the coating agent, starting the re-clamping and increasing the clamping force to 20 t in 3 seconds, were performed in the completely same manner as Example 2. However, the mold-clamping was maintained for 180 seconds instead of 90 seconds, and the mold was opened to take out the molded product. There was formed a coating film having a thickness of about 100 μm over the entire surface of the molded product not re-heated. However, the coating film had low gloss and low hardness since the coating film was not re-heated.

Table 4 shows evaluation results of the coating film properties of Example 2 and Comparative Example 2.

TABLE 3

|  | Coating agent C |
|---|---|
| Urethane acrylate oligomer (1) | 60.0 |
| Tripropylene glycol diacrylate | 40.0 |
| Aluminum pigment (1) | 1.5 |
| Aluminum pigment (2) | 4.5 |
| Zinc stearate | 1.5 |
| Tinuvin 292 | 0.8 |
| Tinuvin 1130 | 1.6 |
| 8% cobalt octoate | 0.2 |
| Bis(4-t-butylcyclohexyl)peroxydicarbonate | 0.2 |
| t-alumiperoxy-2-ethylhexanoate | 1.5 |
| Lysinetriisocyanate | 10.0 | t-alumiperoxy-2-ethylhexanoate: organic peroxide having a one-minute half-life temperature of 127° C.

TABLE 4

|  | Ex. 2 C | Comp. Ex. 2 C |
|---|---|---|
| Specular gloss (*1) | 85 | 68 |
| Pencil scratch value (*1) | HB | 2B |
| Grid tape method (*1) | 10 | 2 |

Comparative Example 3

A molded product was prepared in the same manner as Comparative Example 1 except that the mold temperature was increased to 105° C., the re-clamping was started after the completion of injecting the coating agent, the mold-clamping force was increased to 20 t in one second and maintained for 60 seconds and the mold was opened to take out the molded product. It had been known that the gelation time of the coating agent A is 3.5 seconds at 105° C., and the gelation time of the coating agent B is 4.0 seconds at 105° C. There was formed a cured coating film having a thickness of about 100 μm over the entire surface of the molded product. However, there were wrinkles and uneven gloss appeared due to the gelation in the mold. Further, in the case of the coating agent B, the coated molded product was poor in which there were remarkable uneven alignment of aluminum pigment and remarkable weldlines.

INDUSTRIAL APPLICABILITY

Maintaining a sufficient flowability of the coating agent in the mold, a coating film is formed in a semi-cured state having no defects in the external appearance, the coated molded product is taken out from the mold, re-heated in another step to activate the initiator for curing remaining in the coating agent to cure the coating agent to a final cured state, whereby it becomes possible to obtain a coated molded product having no defects in the external appearance and excellent in coating film properties. Further, a process for producing an in-mold coated molded product, which can reduce the molding cycle and is excellent in the productivity, can be provided.

The invention claimed is:

1. A process for producing an in-mold coated molded product, comprising:
    molding a thermoplastic resin material under a mold-clamping pressure in a mold comprising a fixed mold part and a movable mold part each heated at a predetermined temperature to obtain a molded product;
    separating the fixed mold part and the movable mold part when a surface of the molded product is solidified to such a degree that the surface is durable to a pressure of injection and flow of a coating agent;
    injecting the coating agent containing a thermosetting resin material between an inner surface of the mold and the molded product;
    coating the surface of the molded product with the coating agent as the mold is re-clamped after injecting the coating agent;
    removing the molded product coated with the coating agent when the coating agent is cured to such a degree that the coating agent is not peeled off nor cracked by opening the mold; and
    re-heating the molded product after removing the molded product by applying external thermal energy;
    wherein:
    the temperature of re-heating the molded product is higher than the temperature of the mold;
    an organic peroxide is used as an initiator for a curing reaction of the thermosetting resin material;
    the organic peroxide comprises at least two types of organic peroxides; and
    at least one of the organic peroxides has a one-minute half-life temperature higher than the temperature of the mold.

2. The process for producing an in-mold coated molded product according to claim 1, wherein the temperature of the mold is a temperature at which the gelation time of the coating agent is from 5 to 60 seconds.

* * * * *

UNITED STATES PATENT AND TRADEMARK OFFICE
CERTIFICATE OF CORRECTION

| | | |
|---|---|---|
| PATENT NO. | : 7,790,081 B2 | Page 1 of 1 |
| APPLICATION NO. | : 10/494369 | |
| DATED | : September 7, 2010 | |
| INVENTOR(S) | : Kenji Oota et al. | |

It is certified that error appears in the above-identified patent and that said Letters Patent is hereby corrected as shown below:

On the title page, Item (30), the Foreign Application Priority Data has been omitted. Item (30) should read:

-- (30)     Foreign Application Priority Data

Nov. 22, 2001 (JP) .............................. 2001-357687 --

Signed and Sealed this

Sixteenth Day of November, 2010

David J. Kappos
*Director of the United States Patent and Trademark Office*